United States Patent
Lensing et al.

(10) Patent No.: US 11,155,024 B2
(45) Date of Patent: Oct. 26, 2021

(54) METHOD AND DEVICE FOR PRODUCING A REGISTERED EMBOSSED MATERIAL

(71) Applicant: OLBRICH GmbH, Bocholt (DE)

(72) Inventors: Uwe Lensing, Isselburg (DE); Herbert Klein-Hessling, Rhede (DE); Frans Te Welscher, Bocholt (DE); Andre Josten, Bocholt (DE)

(73) Assignee: OLBRICH GmbH, Bocholt (DE)

( * ) Notice: Subject to any disclaimer, the term of this patent is extended or adjusted under 35 U.S.C. 154(b) by 536 days.

(21) Appl. No.: 15/575,854

(22) PCT Filed: Feb. 4, 2016

(86) PCT No.: PCT/EP2016/052436
§ 371 (c)(1),
(2) Date: Nov. 21, 2017

(87) PCT Pub. No.: WO2016/184581
PCT Pub. Date: Nov. 24, 2016

(65) Prior Publication Data
US 2018/0117830 A1    May 3, 2018

(30) Foreign Application Priority Data
May 21, 2015    (DE) ............ 10 2015 006 393.6

(51) Int. Cl.
*B32B 27/32*    (2006.01)
*B29C 59/04*    (2006.01)
(Continued)

(52) U.S. Cl.
CPC .......... *B29C 59/046* (2013.01); *B29C 59/026* (2013.01); *B32B 5/022* (2013.01);
(Continued)

(58) Field of Classification Search
CPC ........... B32B 38/06; B32B 41/00; B44C 1/24; B44B 5/0047
See application file for complete search history.

(56) References Cited

U.S. PATENT DOCUMENTS 6,168,108 B1    1/2001  Morley
6,183,671 B1 *  2/2001  Stauffacher ............ B29C 59/04
                                                        264/132
(Continued)

FOREIGN PATENT DOCUMENTS

CN        1802248 A      7/2006
CN      101873927 A     10/2010
(Continued)

OTHER PUBLICATIONS

International Search Report based on application No. PCT/EP2016/052436 (3 pages and 2 pages of English translation) dated May 3, 2016 (Reference Purpose Only).
(Continued)

*Primary Examiner* — Jacob T Minskey
*Assistant Examiner* — Debjani Roy
(74) *Attorney, Agent, or Firm* — Viering Jentschura & Partner MBB

(57) ABSTRACT

A method for the continuous in-register embossing of a stretchable film is provided where a repeating printed image or a laminate may be formed by way of the stretchable film in an embossing station. The embossing station may include a rotating embossing roll having an embossed image and an associated rotating counter-roll. The printed image length of the film may be stretched longitudinally before the embossing contact with the embossing roll to a length greater than or equal to or smaller than or equal to the embossed image length or the circumference of the embossing roll. The maintenance of register of the embossing may be achieved by way of a relative speed between the circumferential speed (Continued)

of the embossing roll and the web speed of the film in the embossing station.

21 Claims, 5 Drawing Sheets

(51) Int. Cl.
    *B32B 37/00*     (2006.01)
    *B32B 38/06*     (2006.01)
    *B32B 38/00*     (2006.01)
    *B44B 5/00*     (2006.01)
    *B44C 1/24*     (2006.01)
    *B44C 5/04*     (2006.01)
    *D21H 27/20*     (2006.01)
    *B32B 38/18*     (2006.01)
    *B32B 5/02*     (2006.01)
    *B32B 27/30*     (2006.01)
    *B32B 27/12*     (2006.01)
    *B32B 27/08*     (2006.01)
    *B29C 59/02*     (2006.01)
    *E04F 15/10*     (2006.01)
    *B29K 27/06*     (2006.01)
    *E04F 13/00*     (2006.01)
    *E04F 13/18*     (2006.01)

(52) U.S. Cl.
    CPC ............. *B32B 27/08* (2013.01); *B32B 27/12* (2013.01); *B32B 27/304* (2013.01); *B32B 27/32* (2013.01); *B32B 37/00* (2013.01); *B32B 37/0053* (2013.01); *B32B 38/06* (2013.01); *B32B 38/145* (2013.01); *B32B 38/1841* (2013.01); *B44B 5/0047* (2013.01); *B44C 1/24* (2013.01); *B44C 5/04* (2013.01); *D21H 27/20* (2013.01); *B29K 2027/06* (2013.01); *B32B 2250/05* (2013.01); *B32B 2262/101* (2013.01); *B32B 2307/51* (2013.01); *B32B 2315/085* (2013.01); *B32B 2419/04* (2013.01); *B32B 2471/00* (2013.01); *B32B 2607/02* (2013.01); *B44C 5/0461* (2013.01); *E04F 13/002* (2013.01); *E04F 13/18* (2013.01); *E04F 15/107* (2013.01)

(56) References Cited

U.S. PATENT DOCUMENTS

| | | |
|---|---|---|
| 2004/0261639 A1 | 12/2004 | Vaughn et al. |
| 2005/0051044 A1 | 3/2005 | Damm et al. |
| 2010/0272965 A1 | 10/2010 | Schinkoreit et al. |
| 2012/0097315 A1* | 4/2012 | Comerio ............. B32B 38/1841 156/64 |
| 2012/0156447 A1 | 6/2012 | Hein et al. |
| 2014/0044923 A1 | 2/2014 | Gelli |

FOREIGN PATENT DOCUMENTS

| | | |
|---|---|---|
| CN | 102574354 A | 7/2012 |
| CN | 103561946 A | 2/2014 |
| DE | 19955822 A1 | 7/2000 |
| DE | 102014101554 A1 | 4/2015 |
| EP | 1500504 A2 | 1/2005 |
| EP | 2447063 A1 | 5/2012 |
| EP | 2636524 A1 | 9/2013 |
| GB | 2036649 A | 7/1980 |
| GB | 2036649 * | 8/1980 |

OTHER PUBLICATIONS

Chinese Office Action + Chinese Search Report based on Application No. 201680039054.6 dated Dec. 16, 2018 + dated Dec. 12, 2018; 10 pages + 2 pages of English translation of Search Report (for reference purpose only).

* cited by examiner

METHOD AND DEVICE FOR PRODUCING A REGISTERED EMBOSSED MATERIAL

CROSS-REFERENCE TO RELATED APPLICATIONS

The present application is a national stage entry according to 35 USC § 371 of PCT Application No. PCT/EP2016/052436 filed on Feb. 4, 2016, which claims priority to German Application No. 102015006393.6 filed on May 21, 2015.

TECHNICAL FIELD

The subject matter herein generally relates to a method and device for the continuous in-register embossing of a stretchable film provided with a repeating printed image or a laminate formed by way of the film in an embossing station that comprises a rotating embossing roll and has an embossed image and an associated rotating counter-roll.

BACKGROUND

In order to equip printed material webs, such as plastic films, for example those made from PVC, laminates which are produced from material webs or films of this type or else wallpapers with a surface as realistic and true to life as possible, it is known to provide the surface with an embossment which corresponds to the printed image of the material web. It is desired here that the embossment coincides exactly with the printed image. This is known as in-register embossing. Here, a respective printed image which repeats regularly, has a defined printed image length and is printed onto the material web and an associated embossed image, having an embossed image length, of an embossing tool are brought into a congruent position above one another during the embossing operation in an embossing station, and the embossed image is embossed into the printed image over an embossing length. An embossing station of this type can comprise, for example, a rotating embossing roll which has the embossed image and an associated counter-roll as embossing tool. The film is then guided through between said two rolls in such a way that an embossing length of the embossed image configured in a relief-like manner on the surface of the embossing roll is rolled on precisely a corresponding printed image length of the printed image, the contact pressure necessary for the configuration of the embossment on the film being ensured by means of the counter-roll. For example, a wooden structure which recreates nature can be embossed in register in this way into a printed image which depicts a wood grain.

It is problematic here that, on account of inaccuracies during printing of the printed image or on account of material loads of the printed material web or the printed film, for example on account of temperature influences or mechanical influences, the printed image repeated multiple times over the length of a respective material web does not have a constant printed image length. During the embossing, this leads to the embossed image being configured with a constant embossed image length on the embossing roll and rolls on the material web or the film to then not coincide exactly during each embossing operation, by way of its embossing length defined by the embossed image length, with the respective printed image length, with the result that, for example, the printed image of a depicted wood grain does not then coincide with the imprinted or embossed wood structure.

In order to also make in-register embossing possible in cases of this type, EP 2 636 524 A1 has proposed to longitudinally stretch the film, and therefore the printed image situated thereon, before the embossing station is reached or, in the case of the formation of a laminate, before the laminating station is reached, in register in a preheating step to a printed image length which corresponds to the embossed image length of the embossing roll, and subsequently then to subject it to the embossing carried out by the embossing roll which has the embossed image. Here, the circumferential speeds of the counter-roll and the embossing roll and therefore also the web speed of the film or the laminate are identical during the actual embossing of the film or the laminate in the embossing station. This procedure functions, however, only when the embossed image on the embossing roll and therefore as a rule the embossing roll circumference are greater than the original printed image length. If the embossed image and the embossing roll circumference are smaller than the original printed image length, an adaptation to the embossed image length cannot be achieved by way of longitudinal stretching of the printed image. The case can namely also occur that, in the case of the formation of a laminate, the maximum possible longitudinal stretching initially of the film or the laminate, for example owing to the material, is not sufficient to adapt the printed image length to the embossed image length as a result. That is to say, in the case of a given embossing roll, this method does not function both when the printed and/or the stretched printed image length is greater than the embossed image length and also when, owing to the material, the necessary longitudinal stretching of the printed image for adapting the printed image length to the given embossed image length is not possible. In order for it nevertheless to be possible to carry out in-register embossing in cases of this type, the embossing roll has to be exchanged and replaced with an embossing roll of this type with a smaller or greater embossed image length. This means that a respective embossing roll is limited in relation to the variety of products which can be processed with it, and that the storage of a multiplicity of embossing rolls of an embossed motif which differ with regard to their circumference and therefore the respective embossed image length is necessary.

In-register embossing, in which an adaptation of the embossing lengths of an embossed image length configured on an embossing roll to the printed image length of a film or laminate to be embossed is performed, is known from EP 2 447 063 A1. In this method, the adaptation of the embossing length brought about by way of the embossed image and therefore the embossed image length takes place by virtue of the fact that the embossing roll performs a relative speed to the film or laminate web guided past it. The adaptation possibilities for the adaptation of the embossing length to the printed image length remain limited, however, even in the case of the method known from said document. Since the printed image is fed without preceding processing to the embossing station which has the embossing roll, the only adaptation possibility consists in that the circumferential speed of the embossing roll is changed in order to adapt the embossing length to the printed image length. Although it is possible by way of said method to perform an adaptation of the embossing length both to a longer and a shorter printed image length in comparison with the actual embossed image length, the adaptation spectrum with regard to length differences which can be equalized continues to remain limited, however, since the length range which can be compensated for by way of a relative speed between the web speed of the film or of the laminate and the circumferential speed of the embossing roll is not very great if in-register embossing still has to be ensured.

A solution is desired that makes the processing of a relatively great spectrum of printed image lengths possible in the case of continuous in-register embossing by means of an embossing roll.

SUMMARY

It has been discovered that a method for the continuous in-register embossing of a stretchable film provided with a repeating printed image or a laminate may be formed by way of the film in an embossing station that includes a rotating embossing roll and has an embossed image and an associated rotating counter-roll. The printed image length of the film or laminate before the embossing contact with the embossing roll being longitudinally stretched to a length greater than or greater than or equal to or smaller than or smaller than or equal to the embossed image length or the circumference of the embossing roll The maintenance of register of the embossing being achieved by way of a relative speed between the embossing roll and the web speed of the film or laminate in the embossing station, which relative speed compensates in a correcting manner for an existing length difference between the longitudinally stretched printed image and the embossed image of the embossing roll. The film or the laminate may be moved through the embossing region configured between the counter-roll and the embossing roll at a speed which, although it can be regulated, is constant at the time of the in-register embossing.

The present non-limiting embodiments do not necessarily aim to have already set or achieved a maintenance of register between the longitudinally stretched printed image and the rotating embossed image of the embossing roll during the entry of the film into the embossing station or during the formation of the laminate, but rather only during the embossing contact between the web formed from the film or the laminate which has the film and the embossed image of the embossing cylinder. Such as, the set relative speed between the web speed and the circumferential speed of the embossing roll is to carry out more than a precision correction in the sense of the compensation for an existing merely minor length difference.

The present non-limiting embodiments do propose to increase the processing range to be achieved by way of an embossing roll on account of adjustable possible embossing lengths to different printed image lengths by virtue of the fact that, during the embossing operation, the embossing roll is fundamentally moved, that is to say rotated (such as without simultaneous or preceding throwing on or off of the embossing roll onto/from the material web of the film or laminate and, or alternatively such as also without a reduction in the contact pressure between the counter-roll and the embossing roll) at a circumferential speed which brings about and configures a relative speed to the web speed of the film or laminate and to the circumferential speed of the counter-roll. As a result, the embossing roll then fundamentally always slides or "smears" slightly on the surface of the material web formed by the film or the laminate if a length difference between the elongated, longitudinally stretched printed image length and the embossed image length of the embossed image configured on the embossing roll has to be compensated for. If the printed image length to be embossed is smaller than the embossed image length, the circumferential speed of the embossing roll is then greater than the circumferential speed of the counter-roll and greater than the web speed of the film or laminate. If the printed image length to be embossed is greater than the embossed image length, the circumferential speed of the embossing roll is then lower than the circumferential speed of the counter-roll and lower than the web speed of the film or laminate. The in-register embossing is therefore achieved by means of the setting of a relative speed which compensates for the respective length difference of the printed image and the embossed image between the embossing roll on one side and the counter-roll and the web speed of the film or laminate on the other side, the circumferential speeds of the counter-roll and web or film or laminate being identical. Here, however, the printed image length of the film or of the laminate is additionally previously longitudinally stretched before the embossing contact with the embossing roll to a desired length, such as a constant printed image length greater than or greater than or equal to or smaller than or smaller than or equal to the embossed image length or the circumference of the embossing roll. As a result of said prestressing or longitudinal stretching, part of the necessary length adaptation, if not even already the entire necessary length adaptation, is already performed between the printed image and the embossed image before embossing contact with the embossing roll occurs. It is therefore provided to first of all perform at least a partial adaptation of the printed image length of the film or the laminate to the embossed image length of the embossed image configured on the embossing roll, and subsequently to perform an as a rule fundamentally remaining length adaptation between the printed image and the embossed image in order to generate the embossing length necessary for in-register embossing by means of the embossing roll by way of the adaptation of the embossing length brought about by way of the embossed image length to the exhibited printed image length, which adaptation results from the relative speed between the circumferential speed of the embossing roll and the web speed of the film or laminate. A relative speed of this type is not discernible in the embossed image, but makes it possible to emboss both exhibited printed images which have a smaller printed image length in comparison with the embossed image length of the embossing roll and also exhibited printed images of the type which have a greater printed image length in comparison with the embossed image length, by way of one embossing roll. A desired remaining length adaptation should therefore fundamentally be eliminated or compensated for in the embossing station by way of the setting of a circumferential speed of the embossing roll different than the web speed of the film or laminate. A length adaptation of this type is not a precision correction which compensates merely for minor length differences, as disclosed in EP 2 636 524 B1.

Secondly, the procedure of course also comprises the option that the film to be embossed in register or the laminate to be embossed in register runs into the embossing station in a manner gripped by the counter-pressure roll with a printed image length longitudinally stretched in such a way that it, as it were, corresponds exactly to the embossed image length of the embossed image depicted on the embossing roll, that is to say with the tolerance deviations which are technically permitted. In a case of this type, a relative speed then of course does not have to be set between the web speed and the circumferential speed of the embossing roll. For example, in-register longitudinal stretching of the printed image already achieved during entry into the embossing station can be achieved up to fixed point 2 on the counter-roll being reached during the formation of a laminate by virtue of the fact that the laminate is subjected between fixed point 1 and fixed point 2 to elastic longitudinal stretching to the in-register printed image length of the printed image of the laminate.

The present embodiments make it possible to process relatively great spectra of printed image lengths in the case of in-register embossing by means of an embossing roll, by virtue of the fact that a necessary length adaptation is limited neither solely or exclusively by longitudinal stretching of the film and laminate, and therefore a printed image adaptation to the embossed image, nor solely or exclusively by an adaptation of the circumferential speed of the embossing roll, and therefore the configuration of a relative speed between the embossing roll and the web speed of the film or laminate to be embossed, that is to say an adaptation of the embossing length brought about by way of the embossed image length of the embossed image to the printed image length. Rather, the method comprises both possibilities, with the result that the use spectrum of an embossing roll which has a defined diameter is increased considerably in relation to initial printed image lengths which are to be embossed in register. Here, the present embodiments appropriate, such as the plastic and/or elastic properties of the film which are firstly utilized upstream of the embossing station to the extent that possibly necessary or desired longitudinal stretching of the film or laminate is carried out, and which secondly make "smearing" sliding of the embossing roll surface on the surface to be embossed of the film or laminate possible in the embossing apparatus. Here, the pressing, brought about by way of the counter-roll of the embossing station, of the film or laminate onto the embossing surface of the embossing roll is set in such a way that "smearing" sliding of this type is possible in the long term during an operating phase without a change or adjustment of the contact pressure of the counter-roll.

In one non-limiting embodiment for execution of the method, during the passage of the film through the embossing station between a first fixed point configured upstream of the embossing station in the running direction of the film and holds the film or the laminate in a supporting manner and a second fixed point configured by and/or on the counter-roll in the embossing station and holds the film or the laminate in a supporting manner, the stretchable film or the laminate is longitudinally stretched such that the register length is controlled, and is guided from the first fixed point via the second fixed point between the counter-roll and the embossing roll through the embossing station, at the web speed which, although it can be regulated, remains constant or brings about a constant web tension after the desired longitudinal stretching is set, to a third fixed point which holds the film or the laminate in a supporting manner, the printed image length of the film or laminate being longitudinally stretched between the first fixed point and the second fixed point to a length greater than or greater than or equal to or smaller than or smaller than or equal to the embossed image length or the circumference of the embossing roll, and the maintenance of register of the embossing being achieved by way of a circumferential speed of the embossing roll and the relative speed determined as a result between the circumferential speed of the embossing roll and the web speed, which circumferential speed compensates in a correcting manner for a length difference or the possibly existing length difference between the longitudinally stretched printed image of the film or laminate and the embossed image of the embossing roll.

According to a further non-limiting embodiment, a non-limiting expedient and advantageous setting of the relative speed necessary for the adaptation of the embossed image length can be achieved by virtue of the fact that, in the case of a length difference between the longitudinally stretched printed image of the film or laminate and the embossed image of the embossing roll, which length difference exists at a second fixed point, such as the second fixed point, or in the region of a second fixed point, such as the second fixed point, the maintenance of register of the embossing is achieved by way of a setting and/or adjustment of the circumferential speed of the embossing roll and the relative speed determined as a result between the circumferential speed of the embossing roll and the web speed of the film or laminate, which setting and/or adjustment compensates in a correcting manner for the respectively existing length difference between the longitudinally stretched printed image and the embossed image of the embossing roll.

The circumferential speed of the counter-roll is kept constant during the in-register embossing, likewise provided in one non-limiting embodiment.

It is also possible, however, that, in the case of a length difference between the longitudinally stretched printed image of the film or laminate and the embossed image of the embossing roll, which length difference exists at a second fixed point, such as the second fixed point, or in the region of a second fixed point, such as the second fixed point, the maintenance of register of the embossing is achieved by way of a combination of a circumferential speed change both of the circumferential speed of the counter-roll and of the circumferential speed of the embossing roll with setting of the desired compensating relative speed between the circumferential speed of the embossing roll and the web speed of the film or laminate, which combination compensates in a correcting manner for the respectively existing length difference between the longitudinally stretched printed image of the film or laminate and the embossed image of the embossing roll, likewise provided.

According to one non-limiting embodiment, a further possibility consists in that, in the case of a length difference between the longitudinally stretched printed image of the film or laminate and the embossed image of the embossing roll, which length difference exists at a second fixed point, such as the second fixed point, or in the region of a second fixed point, such as the second fixed point, the maintenance of register of the embossing is achieved by way of a setting and/or adjustment of the circumferential speed of the embossing roll and the relative speed determined as a result between the circumferential speed of the embossing roll and the web speed of the film or laminate, which setting and/or adjustment compensates in a correcting manner for the respectively existing length difference between the longitudinally stretched printed image of the film or laminate and the embossed image of the embossing roll, a ratio of the circumferential speed of the embossing roll to the circumferential speed of the counter-roll being set, which ratio is equal to the ratio of the embossed image length of the embossing roll to the length of the longitudinally stretched printed image of the film or the laminate at said second fixed point or in the region of said second fixed point.

Different longitudinal stretches of the printed image or the film or laminate until the embossing station or the second fixed point is reached are possible by way of the method according to a non-limiting embodiment. Furthermore, the printed image of the film or the laminate is longitudinally stretched to a dimensional deviation of the longitudinally stretched printed image from the embossed image length of the embossing roll of up to 50 mm, alternatively up to 10 mm, such as up to 3-5 mm, alternatively up to 0.01-1 mm, greater than or smaller than the embossed image length of the embossing roll between a first fixed point, such as the first fixed point, and a second fixed point, such as the second fixed point. Here, the "setpoint" starting printed image length is, such as, 1600 mm.

It is also possible, however, that the printed image of the film or the laminate is longitudinally stretched to a dimensional deviation of the longitudinally stretched printed image from the embossed image length of the embossing roll of 0.1-20%, alternatively of 0.5-15%, such as of 1-3%, greater than or smaller than the embossed image length of the embossing roll, such as the second fixed point, between a first fixed point, such as the first fixed point, and a second fixed point, such as the second fixed point. Here, the "setpoint" starting printed image length is also, such as, 1600 mm.

In order to make the "smearing" sliding of the embossing roll on the surface of the film or laminate possible, it is expedient if the film or the laminate is heated between a first fixed point, such as the first fixed point, and a second fixed point, such as the second fixed point, such as to a temperature which makes a plastic deformation of the film or the laminate possible, likewise provided.

It is fundamentally also the case that the film or the laminate is longitudinally stretched plastically and/or elastically between a/the first fixed point and a/the second fixed point. According to a further non-limiting embodiment, it is advantageous for the regulation and execution of the method that the film or the laminate is longitudinally stretched plastically and/or elastically between a first fixed point, such as the first fixed point, and a second fixed point, such as the second fixed point Such as, it is possibly expedient and advantageous, however, to not yet pre-stretch the longitudinally stretched printed image length to 100% of the embossed image length before the entry of the laminate or the film into the embossing station.

Furthermore, the film or the laminate is longitudinally stretched to a constant printed image length between a first fixed point, such as the first fixed point, and a second fixed point, such as the second fixed point.

Since the adaptation of the embossed image length to the printed image length is to take place by way of the "smearing" sliding of the embossing roll on the film or laminate to be embossed and the plastic state of the film or laminate is utilized to this end, a setting or change of the contact pressure from the counter-roll to the embossing roll is not necessary. Furthermore, the setting and/or adjustment or change and adaptation of the relative speed, which compensates in a correcting manner, of the circumferential speed of the embossing roll to the web speed of the film or the laminate is carried out during the continuous embossing process without a change in the contact pressure of the counter-roll and the embossing roll and without the counter-roll and the embossing roll being thrown on or thrown off.

The desired relative speed of the embossing roll can advantageously be set by virtue of the fact that a web speed which corresponds to the circumferential speed of the counter-roll is set at the first, second and third fixed point, and the embossing roll is set at a greater or smaller circumferential speed which differs from said circumferential speed, with setting of the relative speed, which compensates in a correcting manner, between the embossing roll circumferential speed and the web speed, which, furthermore, is provided.

In addition, it is advantageous if a constant longitudinally stretched printed image length is set before the entry of the film or laminate into the embossing station. Furthermore, a constant longitudinally stretched printed image length of the printed image of the film or laminate is set between a first fixed point, such as the first fixed point, and a second fixed point, such as the second fixed point, and the maintenance of register of the embossing is achieved by way of an adaptation of the embossing length, which embosses in register, of the embossed image of the embossing roll, which adaptation compensates in a correcting manner for a or the respectively existing length difference between the longitudinally stretched printed image of the film or laminate and the embossed image of the embossing roll, by means of variable adaptation of the circumferential speed of the embossing roll to the set longitudinally stretched printed image length and therefore the relative speed, which compensates in a correcting manner, between the circumferential speed of the embossing roll and the web speed of the film or laminate in the embossing station. Here, it is particularly expedient if a constant longitudinally stretched printed image length is set greater than or smaller than the embossed image length, likewise provided.

For the configuration of a laminate which as a rule has a stabilizing layer or ply (backing) which can be longitudinally stretched to a considerably lesser extent (if at all) than, for example, a PVC film to be applied thereon, it is advantageous if the film which has the printed image is already longitudinally stretched before the formation of the laminate, alternatively to a constant printed image length. In one advantageous non-limiting embodiment the film is fed to a first fixed point, such as the first fixed point, with a pre-stretch of the printed image of the film in the longitudinal direction and the printed image length of the film, which pre-stretch is set between said first fixed point and a zeroth fixed point positioned upstream of said first fixed point and holds the film in a supporting manner, and said film is laminated onto a carrier which stabilizes the pre-stretched printed image of the film at said first fixed point or in the region of said first fixed point in order to form the laminate.

Since, however, a laminate can also still be longitudinally stretched at least partially, that the laminate is formed at a first fixed point, such as at the first fixed point, and is longitudinally stretched, such as elastically, as far as a second fixed point, such as the second fixed point, to the respectively set or desired printed image length of the film or laminate.

Such as when a film is first of all pre-stretched and is then stretched again as a laminate, or when, after formation of the laminate, a length adaptation, which makes in-register embossing possible, of the printed image and the embossing image has to be performed, a method is expedient, according to one non-limiting development, but also, such as, according to a further, non-limiting embodiment, for the continuous in-register embossing of a stretchable film provided with a repeating printed image or laminate formed by way of the film in an embossing station which comprises a rotating embossing roll which has an embossed image and an associated rotating counter-roll, the printed image length of the film or the laminate being longitudinally stretched, before the embossing contact with the embossing roll, to a length greater than or greater than or equal to or smaller than or smaller than or equal to the embossed image length or the circumference of the embossing roll, and the film and its printed image length being longitudinally stretched, such as plastically, between a zeroth fixed point, such as the zeroth fixed point, and a first fixed point, such as the first fixed point, to a printed image length, such as, constant, the film longitudinally stretched in this way being laminated onto a/the carrier (backing) which stabilizes the longitudinally stretched printed image with the formation of the laminate at the first fixed point or in the region of the first fixed point, and, between the first fixed point and a third fixed point, such as the third fixed point, the printed image length of the laminate obtained in this way and the embossing embossed length of the embossed image of the embossing roll being adapted to one another by way of, such as elastic, correcting longitudinal stretching of the laminate between the first fixed point and a second fixed point, such as the second fixed point, and/or by way of the/a relative speed setting, which compensates in a correcting manner, between the circumferential speed of the embossing roll and the web speed of the laminate, said correcting length adaptation being >3%, >20%, such as >50%, of the correction variable of the printed image length set between the zeroth fixed point and the first fixed point. The percentage correction value specified here relates to the "correction variable" as reference point set for the length adaptation of the printed image between the zeroth fixed point (fixed point 0) and the first fixed point (fixed point 1), and not to the printed image length then set (as a result). The relatively high percentage correction values indicate that the second correction or length adaptation of the printed image of the laminate between the first and the second fixed point, compared with the first correction or length adaptation of the printed image of the film between the zeroth and the first fixed point, is not merely a precision correction.

The method as claimed in further independent claim 19 can of course likewise be combined with all combinations of features as claimed in one or more of claims 1-18.

In a further non-limiting embodiment, the printed image of the film or laminate is longitudinally stretched as far as a second fixed point, such as to the second fixed point, to a constant printed image length smaller than or greater than the embossed image length of the embossing roll, and that the embossing embossed length of the embossing roll is adapted to the longitudinally stretched printed image length of the film or laminate by means of a circumferential speed of the embossing roll which generates the relative speed, which compensates in a correcting manner and is adapted to the longitudinally stretched printed image length, of the embossing roll to the web speed of the film or laminate, the ratio of the circumferential speed of the embossing roll to the circumferential speed of the counter-roll being set to be constantly equal to the ratio of the embossed image length on the embossing roll to the longitudinally stretched printed image length of the film or laminate at the second fixed point or in the region of the second fixed point.

Furthermore, the above object is achieved by way of the use of an embossed laminate produced as claimed in one of claims 1-20 as surface material of a flooring laminate, a wall or floor tile laminate or a surface of an object of use.

The above object is likewise achieved by way of an apparatus for carrying out a method as claimed in one or more of claims 1-20, distinguished by the fact that it has a laminating or lining apparatus with at least two associated feed tools, it being possible for an elastically and/or plastically longitudinally stretchable print film which has a printed image which repeats in accordance with a register length to be fed in via a first feed tool and a carrier which can be longitudinally stretched elastically only to a limited extent to be fed in via a second feed tool in a guided manner to the laminating or lining apparatus, and to be moved into a desired position above one another in or on said laminating or lining apparatus with the configuration of a composite material or laminate, and at least the first feed tool which comprises a preheating roll and the laminating or lining apparatus which comprises a laminating drum being configured such that the spacing from one another can be varied and/or they can be operated at rotational speeds which differ from one another and/or in opposite rotational directions, and the laminating or lining apparatus being assigned an embossing station which has an embossing tool and to which the laminate can be fed for in-register embossing, the laminating or lining apparatus and the embossing tool being configured such that the spacing from one another can be varied and/or they can be operated at rotational speeds which differ from one another and/or in opposite rotational directions.

Finally, in one non-limiting embodiment of the apparatus, the apparatus has web/web sensors which measure the register length of the printed image of the embossed laminate downstream of the embossing station in the production direction of the laminate embossed in register.

BRIEF DESCRIPTION OF THE DRAWINGS

Certain embodiments will now be described, by way of example only, with reference to the following figures.

DETAILED DESCRIPTION

Figure 1:
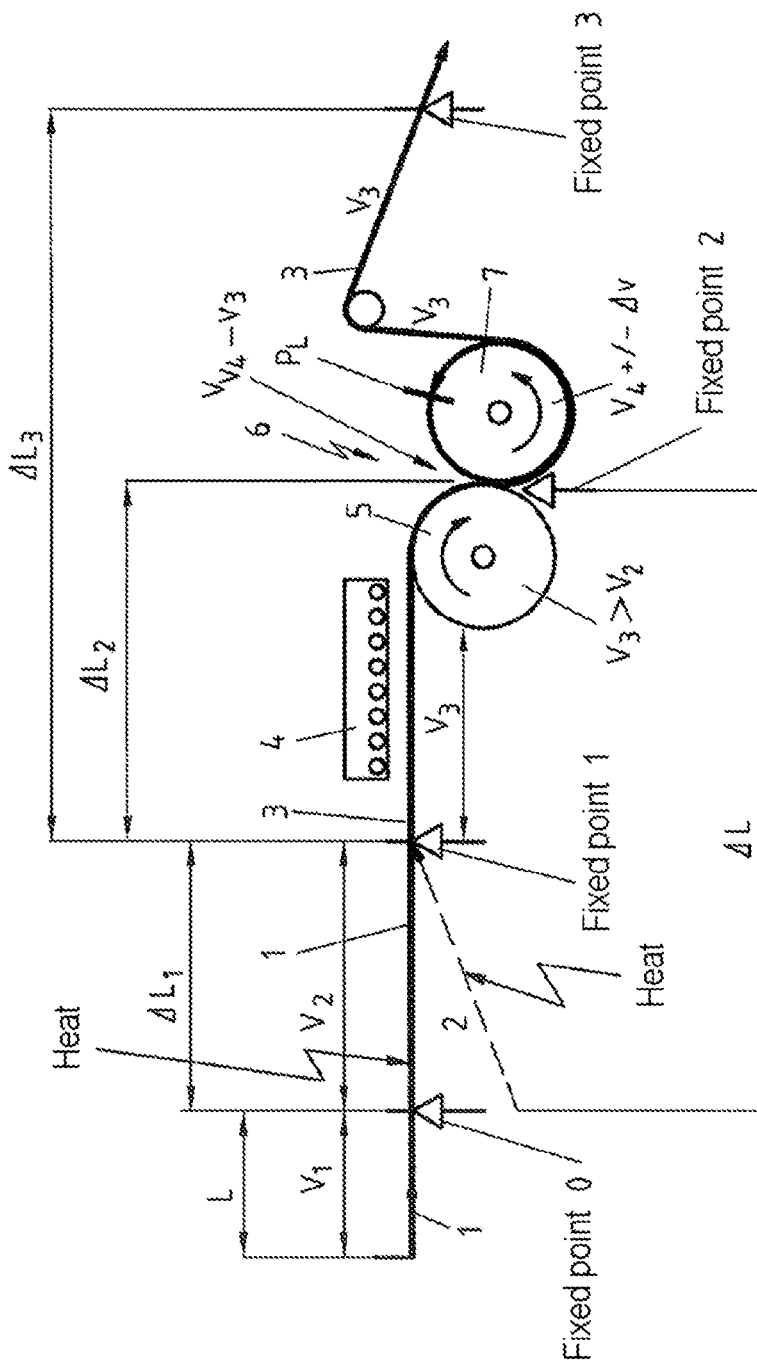
FIG. 1 shows a diagrammatic illustration of an apparatus for carrying out the method for the in-register embossing of a laminate with a first type of setting and regulation of the relative speed between the embossing roll and the counter-roll.

FIG. 1 diagrammatically shows one embodiment of the method, in which embodiment an elastically stretchable film 1, which can be a PVC film, is fed at a web speed $V_1$ to a zeroth fixed point (fixed point 0). From there, the film 1 is guided at a web speed $V_2$ greater than $V_1$ to a first fixed point (fixed point 1), at which the film 1 is laminated onto a carrier 2 fed in or what is known as a backing. A first longitudinal stretching or pre-stretching of the (print) film 1 provided with a printed, regularly repeating printed image takes place on the path from the fixed point 0 to the fixed point 1. Said longitudinal stretching $\Delta L_1$ is brought about by way of control of the web tension between the zeroth and the first fixed point or by way of different roll speeds at the fixed points 0 and 1 or by way of a change in the spacing of the rolls at the fixed points 0 and 1. For example, there are rolls at the fixed points 0 and 1 when a lamination of the film 1 onto the carrier 2 takes place at fixed point 1 by means of a laminating drum 8 configured as a roll, and the feed of the film 1 to the laminating drum 8 is guided over a preheating roll 9 arranged at fixed point 0. A configuration of this type of a combination of a laminating station with an embossing station is described, for example, in DE 10 2014 101 554 A1, reference being made expressly hereby to the disclosure thereof. Between the first fixed point (fixed point 1) and a second fixed point (fixed point 2) configured on or in the region of the counter-roll 5 of the embossing station 6, the laminate 3 is heated by means of a heating apparatus 4 to a temperature which makes a plastic deformation possible, and is subjected to a second longitudinal stretching $\Delta L_2$ by means of a web speed $V_3$ greater than the web speed $V_2$. At the second fixed point 2, a longitudinally stretched printed image length $(L+\Delta L_1+\Delta L_2)$ of the printed image is then set, which printed image length is smaller than or greater than the embossed image length of an embossed image $P_L$ configured on the embossing roll 7 of the embossing station 6. The laminate 3 is then guided at the web speed $V_3$ as far as a third fixed point (fixed point 3). In the embossing station 6, the longitudinally stretched printed image of the laminate 3 is embossed in register by means of the embossed image of the embossing roll 7. In order to adapt the embossing length, which embosses the printed image, of the embossed image configured on the embossing roll 7 to the printed image length of the longitudinally stretched printed image of the laminate 3, the embossing roll 7 is moved in the embossing station 6 at a circumferential speed $V_4$ which brings about a relative speed $V_{V4-V3}$, which compensates in a correcting manner, to the web speed $V_3$ of the laminate and to the circumferential speed $V_3$ of the counter-roll 5. The circumferential speed $V_4$ is different than the web speed $V_3$ and is regulated in such a way that the embossed image length $P_L$ rolls precisely on the provided printed image length of the longitudinally stretched printed image of the laminate 3, that is to say, at the time of the in-register embossing, the embossing embossed length of the embossing brought about by way of the embossing contact of the embossed image with the laminate 3 or the film 1 is equal to the longitudinally stretched printed image length.

The embossing takes place without throwing the embossing roll 7 off from the material web 3 and the counter-roll 5, and exclusively utilizes the plastic properties of the film 1, it being possible for the embossing roll 7 to slide or "smear" over the laminate 3. Before its lamination onto the carrier 2, the longitudinal stretching $\Delta L_1$ of the film 1 is achieved by means of a control of the web tension (film), for example by means of different roll speeds at fixed point 0 and fixed point 1 or by means of a change in the spacing of the rolls which are arranged at a variable spacing at fixed point 0 and at fixed point 1. A constant web tension and/or a constant web speed are/is regulated between fixed point 1 and fixed point 3 ($\Delta L_3$) via the counter-(pressure) roll 5 of the embossing station 6 and/or the drive at fixed point 1 and/or at fixed point 3. The longitudinal stretching $\Delta L_2$ of the printed image of the laminate 3 is set between fixed point 1 and fixed point 2 to a length of the printed image, such as such that the register length is controlled, in such a way that the longitudinally stretched printed image $(L+\Delta L_1+\Delta L_2)$ set is smaller than or greater than the circumference of the embossing roll 7 and therefore smaller or greater than the embossed image length $P_L$ of the embossed image configured in a relief-like manner on the circumferential face of the embossing roll 7. The in-register embossing is then ensured by way of a relative movement, namely the different relative speed $V_{V4-V3}$, which compensates in a correcting manner, of the embossing roll 7 to the material or product web, that is to say to the laminate 3, without a reduction in the embossing pressure applied, such as, by the counter-roll 5. In this case, the control part $+/-\Delta V$ necessary for setting the relative movement or the relative speed $V_{V4-V3}$ of the embossing roll 7 acts on the circumferential speed $V_4$ of the embossing roll 7.

Figure 2:
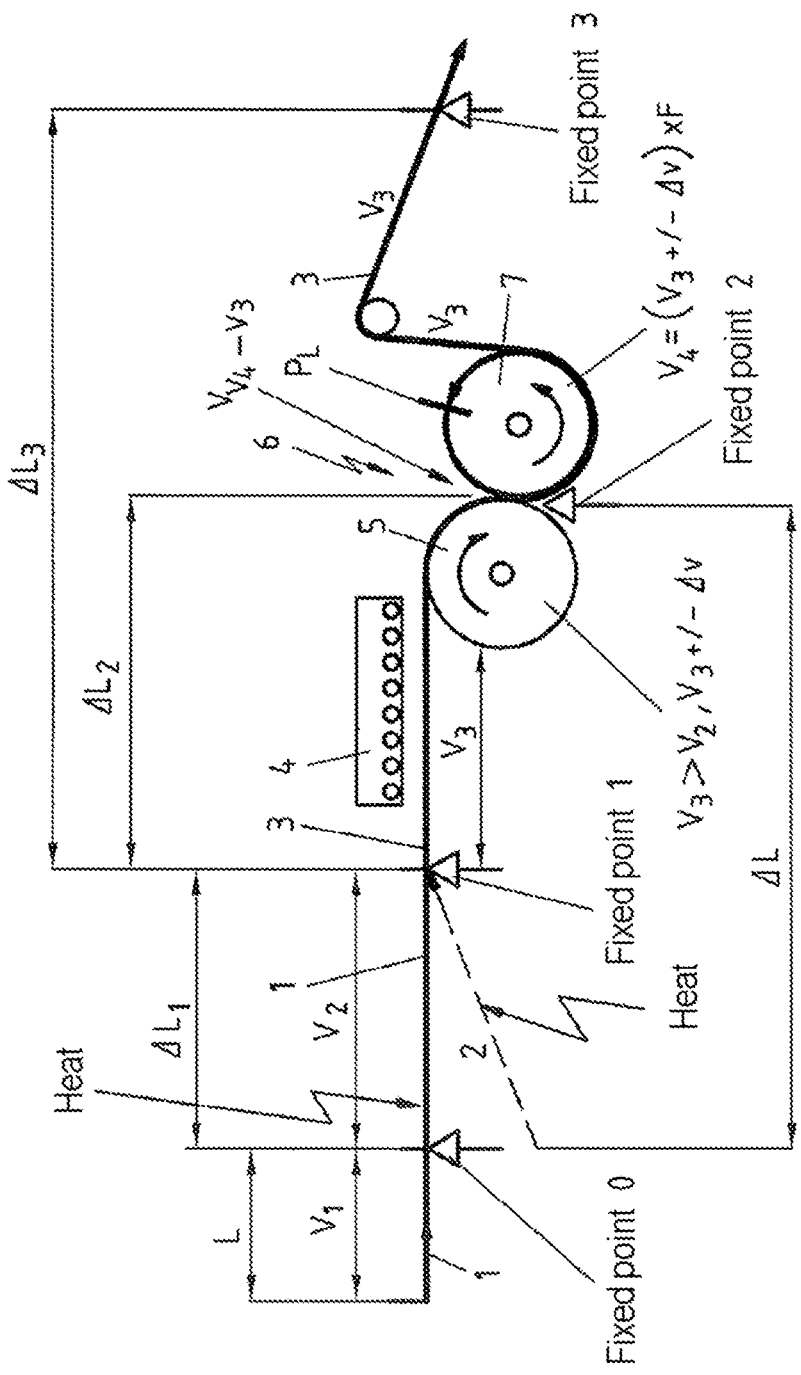
FIG. 2 shows a diagrammatic illustration of an apparatus for carrying out the method for the in-register embossing of a laminate with a second type of setting and regulation of the relative speed between the embossing roll and the counter-roll.

In that exemplary embodiment of the method according to FIG. 2 which is of identical configuration in terms of system technology but different in terms of regulating technology than the first exemplary embodiment, the only difference consists in the regulation of the circumferential speeds $V_3$ of the counter-roll 5 and $V_4$ of the embossing roll 7. Whereas, in the case of the first exemplary embodiment, the regulated or set circumferential speed $V_3$ of the counter-roll 5 remains constant and the compensation of the length difference between the longitudinally stretched printed image $(L+\Delta L_1+\Delta L_2)$ and the embossed image length $P_L$ is realized exclusively by way of an adaptation, which compensates in a correcting manner, of the circumferential speed $V_4$ of the embossing roll 7, both the circumferential speed $V_3$ of the counter-roll 5 and the circumferential speed $V_4$ of the embossing roll 7 are adjusted or set and regulated, in the case of said second exemplary embodiment, in order to adapt the longitudinally stretched printed image length $(L+\Delta L_1+\Delta L_2)$ and the embossing embossed length of the embossed image during the embossing. Although the embossing roll 7 continues to move at a circumferential speed $V_4$ different than the respective web speed $V_3$ and than the respective circumferential speed $V_3$ of the counter-roll 5, the length adaptation of the longitudinally stretched printed image length and the embossing embossed length of the embossing brought about by way of the embossed image always takes place uniformly in such a way that the ratio of the circumferential speed $V_4$ of the embossing roll 7 to the circumferential speed $V_3$ of the counter-roll 5 is always equal to the ratio of the embossed image length $P_L$ of the embossed image on the embossing roll 7 to the printed image length $(L+\Delta L_1+\Delta L_2)$, which is as a rule and, such as, longitudinally stretched, of the individual printed image of the film 1 or laminate 3 when leaving the second fixed point (fixed point 2) or when coming into contact with the embossing roll 7. This is expressed in FIG. 2 by virtue of the fact that $V_4=(V_3+/-\Delta V)\times F$, the factor F representing the ratio of the embossed image length $P_L$ to the printed image length $(L+\Delta L_1+\Delta L_2)$.

Both in the exemplary embodiment according to FIG. 2 and in the exemplary embodiment according to FIG. 1, the circumferential speed $V_3$ of the counter-roll 5 and the web speed $V_3$ of the film 1 or laminate 3 between the first fixed point (fixed point 1) and the third fixed point (fixed point 3) are greater than the web speed $V_2$ of the film 1 between the zeroth fixed point (fixed point 0) and the first fixed point (fixed point 1).

In the exemplary embodiment according to FIG. 2, the longitudinal stretching of the laminate 3 before its embossing in the embossing station 6 is carried out by means of the counter-roll 5, that is to say the second fixed point (fixed point 2) in the embossing station 6 and/or the first fixed point (fixed point 1) which can be configured, for example, on the laminating drum 8, such as to longitudinally stretched printed image lengths $(L+\Delta L_1+\Delta L_2)$ which are smaller than or greater than the circumference of the embossing roll 7 and therefore of the embossed image $P_L$ configured thereon. The web speed $V_3$ between the first fixed point (fixed point 1) and the third fixed point (fixed point 3) results from said longitudinal stretching $(L+\Delta L_1+\Delta L_2)$ of the laminate. In order to carry out the in-register embossing, the additional relative movement $V_{V4-V3}$ of the embossing roll 7 to the material or product web or to the laminate 3 is then added, which relative movement $V_{V4-V3}$ brings about in-register rolling of the embossed image $P_L$ on a respective longitudinally stretched printed image and, as a result, embossing of the respective printed image with an embossing embossed length, without a reduction or change in the embossing pressure by way of the circumferential speed $V_4$ of the embossing roll 7, which circumferential speed $V_4$ differs, as has been mentioned, from the speed $V_3$ by the factor F. In this exemplary embodiment, the control part +/−ΔV is related both to the circumferential speed $V_3$ of the counter-(pressure) roll 5 and to the circumferential speed $V_4$ of the embossing roll 7. Between the first fixed point (fixed point 1) and the second fixed point (fixed point 2), the printed image length of the laminate 3 is longitudinally stretched to a printed image length $(L+\Delta L_1+\Delta L_2)$ constant but differs from the circumference of the embossing roll 7 and therefore from the embossed image length $P_L$. By means of the relative movement $V_{V4\text{-}V3}$ of the embossing roll 7 to the material web of the laminate 3, that embossing length of the embossed image of the embossing roll 7 which acts on the film 1 or the laminate 3 in an embossing manner during the in-register embossing is then set and regulated to the longitudinally stretched printed image length $(L+\Delta L_1+\Delta L_2)$.

Figure 3:
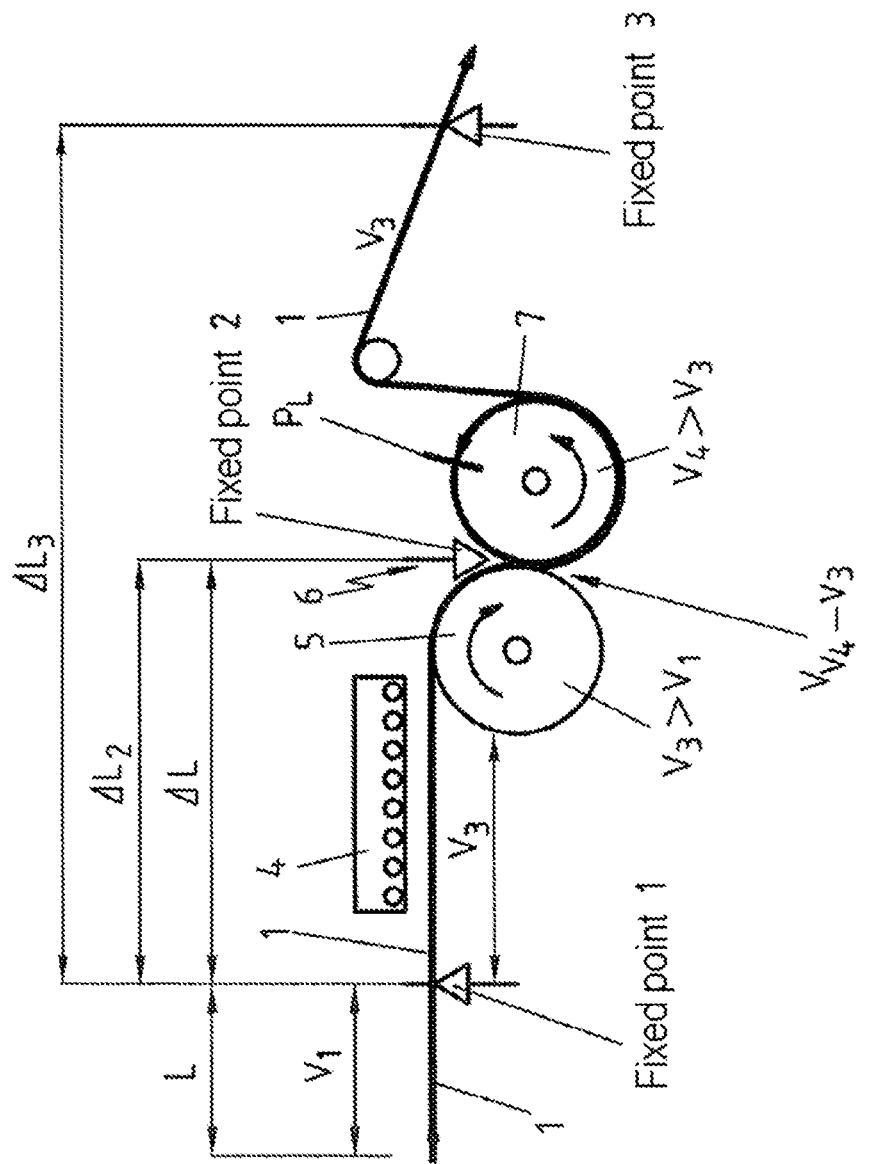
FIG. 3 shows a diagrammatic illustration of elements for carrying out the in-register embossing of a print film.
Figure 4:
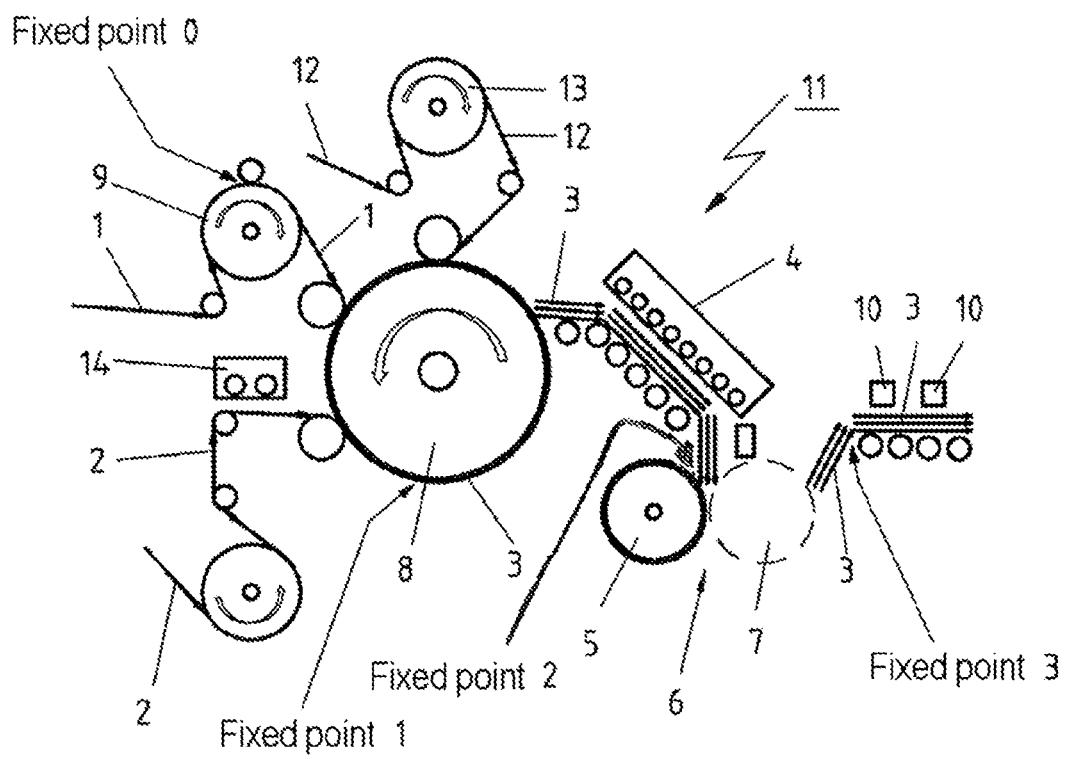
FIG. 4 shows a diagrammatic illustration of an apparatus for carrying out the methods.

The exemplary embodiment according to FIG. 3 shows the in-register embossing of a film 1, without it being laminated onto a carrier 2. In this exemplary embodiment, the film 1 can also configure, for example, a wallpaper. In the case of said exemplary embodiment, the circumferential speed $V_3$ of the counter-roll 5, and also the web speed $V_3$, are greater than the feed speed $V_1$ of the film 1 to the first fixed point (fixed point 1), with the result that longitudinal stretching of the film 1 and therefore of the printed image printed thereon or the printed images which are printed thereon takes place between the first fixed point (fixed point 1) and the second fixed point (fixed point 2). Since the longitudinal stretching of the film 1 and therefore of each printed image as far as fixed point 2 as a rule leads to a respectively longitudinally stretched printed image, the printed image length smaller than the embossed image length $P_L$ of the embossed image configured on the circumference of the embossing roll 7, the circumferential speed $V_4$ of the embossing roll 7 is additionally greater than the web speed $V_3$. The relative movement brought about as a result and the relative speed $V_{V4\text{-}V3}$, which compensates in a correcting manner, between the embossing roll 7 and the material web or film 1 are set and regulated in such a way that, during the in-register embossing, an adaptation of the embossing embossed length of the embossed image is set to that printed image length of the printed image longitudinally stretched $(L+\Delta L_2)$ on the film 1. In this exemplary embodiment, the control parts +/−ΔV, that is to say the speed change or changes which is/are set, act both on the circumferential speed $V_3$ of the counter-(pressure) roll 5 and on the circumferential speed $V_4$ of the embossing roll 7.

In all figures, identical elements or components are provided in each case with the same designations.

The film 1 is also already subjected to an influence of heat (preheating roll 9 and laminating drum 8) and to longitudinal stretching $\Delta L_1$ in the section between fixed point 0 and fixed point 1, with the result that a printed image which has already been longitudinally stretched is laminated onto the carrier 2 during the formation of the laminate 3.

The respective position of the embossed image on the embossing roll 7, but also the position of the longitudinally stretched printed image on the film 1 or the laminate 3, is detected by way of customary embossing marks which are known from printing technology and, for example, optical detection units or sensors 10, and forms the basis for the necessary regulations. Corresponding detection units can be configured on the embossing roll 7, upstream of the embossing station 6 and also downstream of the embossing station 6. Examples of this are described in DE 10 2014 101 554 A1, EP 2 447 063 A1 and EP 2 636 524 A1, to which recourse can be made in order to implement the present non-limiting embodiments. The "setpoint" starting printed image length L lies in the range between approximately 914.4 mm (36 inches) and 2000 mm, alternatively 1000 mm-1500 mm, in the case of the application of the metric system, and between 914.4 mm-1219.2 mm (36 inches-48 inches) in the case of the application of an imperial system.

Figure 5:
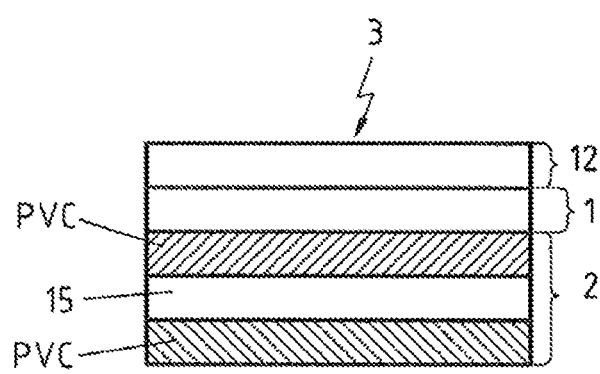
FIG. 5 shows a diagrammatic illustration of a sectional drawing through a laminate formed in a laminating or lining apparatus.

The system or apparatus for producing a laminate 3 embossed in register, which system or apparatus is suitable for carrying out the methods, is shown in FIG. 5, and is denoted overall by 11, comprises the laminating drum 8 heated to a temperature of 100° C.−180° C. and to which a clear film 12, the print film 1 printed with a (regularly) repeating printed image of a defined printed image length, and the carrier or the backing 2 are fed and are processed on the laminating drum 8 to form the stretchable, substantially three-layer laminate 3 in film form. Subsequently, the laminate 3 runs through the (first) heat device 4 (IR field) and is fed to the register embossing or embossing station 6 which comprises an embossing roll 7, configured with an embossed image of a defined embossed image length $P_L$ on its outer circumference, and the counter-pressure roll 5. In-register embossing of the printed image of the print film 1 by means of the embossed image of the embossing roll 7 takes place in the embossing station 6. Here, the embossing station 6, to be precise the counter-pressure roll 5 or the embossing roll 7, configures the second fixed point (fixed point 2) for the laminate 3 and the print film 1 connected to it, which second fixed point holds the laminate 3 and therefore also the print film 1 in a force-influencing manner. The counter-pressure roll 5 rotates at the circumferential speed $V_3$ equal to the strip speed $V_3$ of the laminate 3 in the embossing station 6. The embossing roll 7 rotates at a circumferential speed $V_4$. Following the embossing station 6, the laminate 3 is guided out of the system or apparatus 11 at a strip speed $V_3$ via a third fixed point (fixed point 3) which holds the laminate 3 and therefore also the print film 1 in a force-influencing manner.

In order to form the laminate 3, the clear film 12 is first of all guided over a first preheating roll 13 heated to a temperature of 50° C.−120° C., and is fed at a temperature of approximately 40° C. to a first laminating point configured on the laminating drum 8.

The printed print film 1 is guided over the second preheating roll 9 heated to a temperature of 30° C.−70° C., and is fed at a temperature of approximately 45° C. to a second laminating point configured on the laminating drum 8. At said second laminating point, the print film 1 is laminated onto the clear film 12 which then has a temperature of approximately 155° C. The second preheating roll 9 configures the zeroth fixed point (fixed point 0) for the print film 1, which zeroth fixed point holds the print film 1 in a force-influencing manner.

The backing 2 is heated in a second heating device 14 (IR field) to a temperature of approximately 160° on its upper side and a temperature of approximately 40° on its underside, and is fed to a third laminating point configured on the laminating drum 8. At said third laminating point, the backing 2 is laminated onto the pre-laminate which comprises the clear film 12 and the print film 1 and then has a temperature of approximately 140° C. In addition, the laminating drum 8 configures the first fixed point (fixed point 1) for the laminate 3 and the print film 1 connected to it, which first fixed point holds the laminate 3 produced and therefore the print film 1 in a force-influencing manner.

The three-layer laminate 3 leaves the laminating drum 8 at a temperature of approximately 155° C. on its upper side and a temperature of approximately 60° C. on its underside. Afterward, the laminate 3 runs through the (first) heat device 4 (IR field), and is fed at a temperature of approximately 160° C. on its upper side and a temperature of approximately 80° C. on its underside to the register embossing or embossing station 6 and the second fixed point (fixed point 2). After the in-register embossing, the laminate 3 reaches the third fixed point (fixed point 3) at a temperature of approximately 120° C. on its upper side and a temperature of approximately 90° C. on its underside.

During the embossing of the laminate 3 in the register embossing or embossing station 6, no change in the contact pressure between the embossing roll 7 and the counter-pressure roll 5 and also no (possibly short-term) separation of the embossing roll 7 and the counter-pressure roll 5 in the sense of the embossing roll 7 and the counter-pressure roll 5 being moved apart from one another occur during the running production operation. The system or apparatus 11 is also not designed to carry out measures of this type as a constituent part of the embossing procedure during the running production operation.

The printed print film 1 is a PVC film. The print film 1 is fed to the zeroth fixed point (fixed point 0) at a strip speed of $V_1$, and is subsequently moved as far as the first fixed point (fixed point 1) at a web or strip speed $V_2$. The laminate 3 is moved at the strip speed $V_3$ from the first fixed point (fixed point 1) as far as the second fixed point (fixed point 2), and beyond the latter as far as the third fixed point (fixed point 3). It is true here that $V_1 < V_2 < V_3$. This results, such as, from the longitudinal stretches $\Delta L_1$ and $\Delta L_2$ of the film 1 and/or the laminate 3.

The original printed image length L of the printed print film 1 and the embossed image length PL of the embossed image are different. During the performance of one exemplary embodiment of the method, a plastic longitudinal stretching of the printed image length L of the printed image of the print film 1 by a fluctuating magnitude $\Delta L_1$ to a constant printed image length $L+\Delta L_1$ therefore as a rule always takes place in the region $\Delta L_1$ between the zeroth fixed point (fixed point 0) and the first fixed point (fixed point 1). With said printed image length $L+\Delta L_1$, the print film 1 on the laminating drum 8 is connected at the third laminating point to the backing 2 by way of lamination in a way which fixes said printed image length $L+\Delta L_1$. Subsequently, a further elastic longitudinal stretching of the laminate 3 to the register length necessary for the embossing as a rule always also takes place in the regions $\Delta L_2$ and $\Delta L_3$. The entire longitudinal stretching $\Delta L_3$ of the laminate 3 depends here on whether a length change or length adaptation of the embossing embossed image length $P_L$ and the submitted printed image length in a manner register length controlled is added to the longitudinal stretching $\Delta L_2$ of the laminate 3 as far as or after the second fixed point (fixed point 2), which length change or length adaptation is brought about by way of a relative speed $V_{V4\text{-}V3}$ between the circumferential speed $V_4$ of the embossing roll 7 and the circumferential speed $V_3$ of the counter-pressure roll 5. The longitudinal stretching $\Delta L_3$ and therefore also the longitudinal stretching $\Delta L_2 + V_{V4\text{-}V3}$ are concluded, however, at the latest during the actual embossing operation in the register embossing or embossing station 6. Therefore, in the case of said exemplary embodiment, at least one further longitudinal stretching $\Delta L_2$ as a rule always takes place in order to achieve the register length necessary for in-register embossing, which longitudinal stretching $\Delta L_2$ is configured in the region $\Delta L_2$ as elastic longitudinal stretching of the laminate 3 and therefore also of the print film 1. Moreover, the longitudinal stretching $\Delta L_3$ and therefore also the longitudinal stretching $\Delta L_2 + V_{V4\text{-}V3}$ are always greater than 3% of the longitudinal stretching $\Delta L_1$, and to be precise it is the case that: $\Delta L_3 > 0.03\ \Delta L_1$. That is to say, the further longitudinal stretching $\Delta L_2$ or $\Delta L_2 + V_{V4\text{-}V3} = \Delta L_3$ which as a rule still takes place after the formation of the laminate 3 which takes place at the first fixed point (fixed point 1) is at least 3% of the first longitudinal stretching $\Delta L_1$ which has as a rule been previously carried out between the zeroth fixed point (fixed point 0) and the first fixed point (fixed point 1). Should an adaptation of the embossing length of the embossed image of the embossing roll 7, which embossing length embosses onto the submitted printed image, by means of the relative speed $V_{V4\text{-}V3}$ not even become necessary in the specific individual case, at least the longitudinal stretching $\Delta L_2$ of the second stage fulfills the condition as a result of being greater than $0.03\ \Delta L_1$. In the case of said in-register embossing method, two-stage longitudinal stretching of the print film 1 therefore as a rule necessarily always takes place, with a first stage ($\Delta L_1$) of the plastic longitudinal stretching of the print film 1, which first stage ($\Delta L_1$) corresponds to the region between the zeroth fixed point (fixed point 0) and the first fixed point (fixed point 1), and a second stage ($\Delta L_3 = \Delta L_2 + $ possibly $V_{V4\text{-}V3}$) of the elastic longitudinal stretching of the laminate 3 which comprises the print film 1, which second stage ($\Delta L_3 = \Delta L_2 + $ possibly $V_{V4\text{-}V3}$) corresponds to the region between the first fixed point (fixed point 1) and the third fixed point (fixed point 3).

With the aid of the fixed points (fixed point 0 to fixed point 3) which hold in each case the laminate 3 and/or the print film 1 in a force-influencing manner, a tensile force (product web tension) which brings about longitudinal stretching of the print film 1 or the laminate 3 can be exerted on the print film 1 and/or the laminate 3 in each case between two adjacent fixed points.

Figure 6:
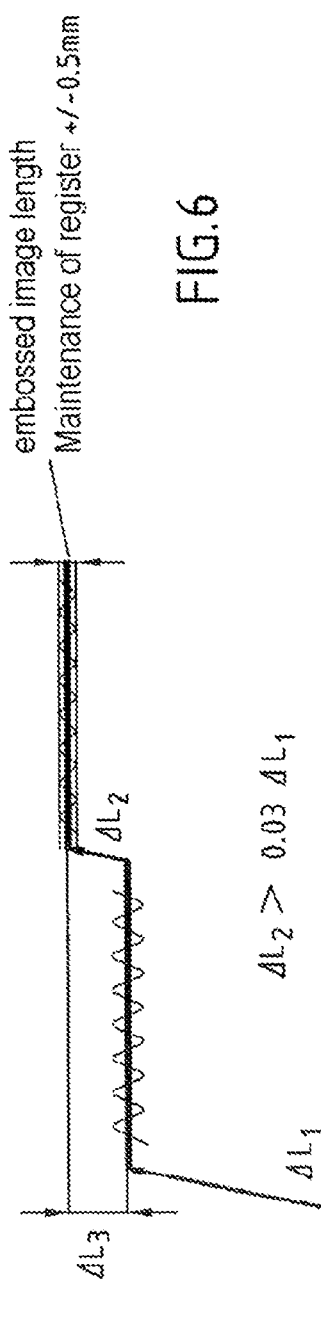
FIG. 6 shows a diagrammatic illustration of the two-stage stretching of a laminate to an in-register printed image length.
Figure 7:
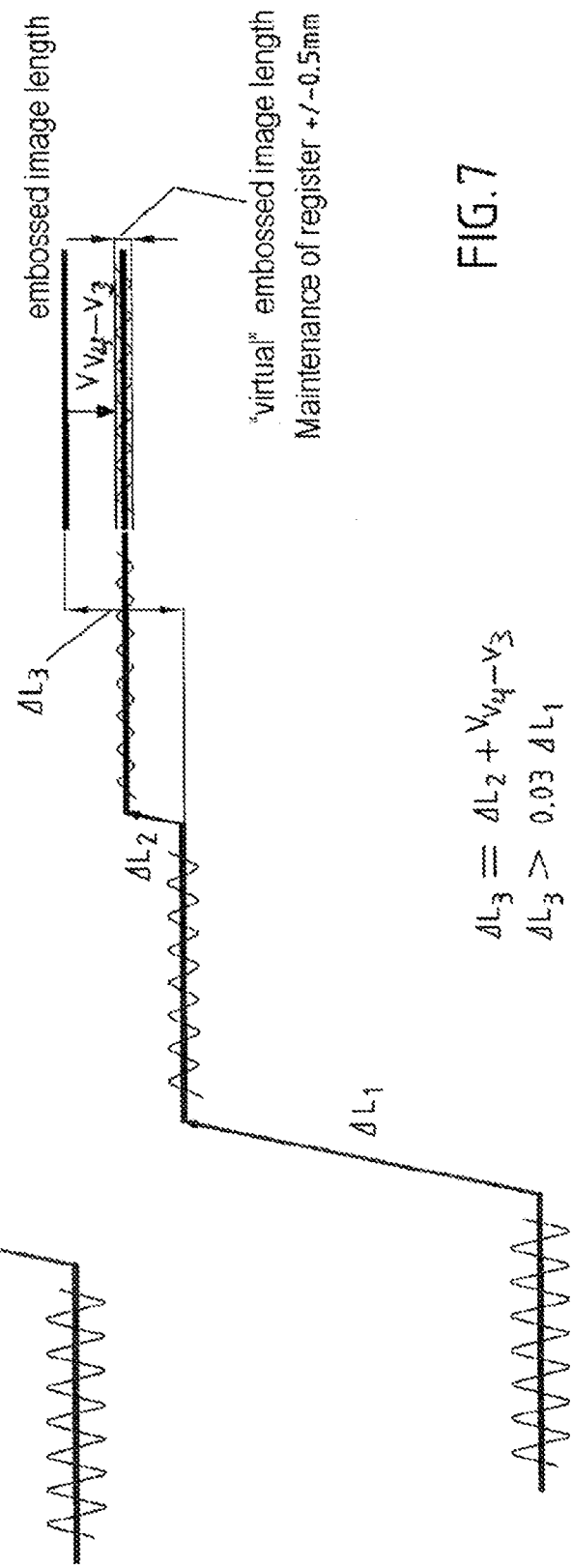
FIG. 7 shows a diagrammatic illustration of a two-stage longitudinal stretching of the laminate to an approximate in-register printed image length with a smearing relative speed of the embossing roll.

The longitudinal stretching operations of the print film 1 and/or the stretchable laminate 3 which are carried out in each case in steps $\Delta L_1$, $\Delta L_2$ and $\Delta L_3$, and the adaptation of the embossed image length $P_L$ to the submitted printed image length, which adaptation is possibly additionally performed on the basis of the adaptation of the circumferential speed $V_4$ to the web speed $V_3$, are shown diagrammatically and in relation to their proportionality in FIGS. 6 and 7.

The maintenance of register is considered to be achieved if the embossing roll 7 is presented a printed image length which differs at most between +/−0.5 mm from the embossed image length $P_L$. The tolerable deviations during in-register embossing of 0.1 mm or +/−0.15 mm which are known from other areas of technology (printing and paper processing machines according to DE 199 55 822 A; embossing of wooden composite boards according to EP 1 500 504 A2) are not relevant for foil embossing, since the print films 1 and the laminates 3 have a considerably different elasticity behavior in comparison with paper and wooden composite boards. The more narrow tolerance ranges which are known from said areas of technology therefore cannot be taken into consideration for the definition of the maintenance of register of the embossing operation. Furthermore, in the case of said embodiment of the method, a maintenance of register is not achieved in this sense after the first plastic longitudinal stretching $\Delta L_1$, and the second, elastic longitudinal stretching $\Delta L_2$ or $\Delta L_2 + V_{V4\text{-}}$ $V_3$ which always takes place is always greater than 0.03 $\Delta L_1$. The maintenance of register is set only by way of the second longitudinal stretching $\Delta L_2$ or $\Delta L_3$ which always takes place.

In the case of said exemplary embodiment, no maintenance of register in relation to the embossing roll 7 has therefore yet been achieved in the three-layer stretchable laminate 3 after the plastic longitudinal stretching $\Delta L_1$ has taken place, it being considered that the maintenance of register is achieved in the case of a deviation of the printed image length of +/−0.5 mm from the embossed image length $P_L$. The length dimension of the printed image of the print film 1 achieved after the first longitudinal stretching $\Delta L_1$ lies outside customary tolerance values of +/−0.5 mm which are possibly to be subsumed under the term "maintenance of register" or "in registration" in the field of technology of the embossing of foils. It is true that $L+\Delta L_1 \neq P_L +/- 0.5$ mm, that is to say the longitudinal stretching of the printed image set after the first longitudinal stretching stage lies outside the maintenance of register, and to be precise outside the deviation of −0.5 mm. This means at the same time that the relationship $L+\Delta L_1 +>0.03\ \Delta L_1 +$possibly $V_{V4-V3}=P_L+/-0.5$ mm or $L+\Delta L_1 +$possibly $V_{V4-V3}<P_L-0.5$ mm$-0.03\ \Delta L_1$ is still valid.

Moreover, the stretchable three-layer laminate 3 is subjected to a reduction in width in the region $\Delta L_2$, since a product web tension greater than zero acts on the laminate 3 in said region of the second longitudinal stretching $\Delta L_2$.

The embossed image length $P_L$ of the embossed image engraved on the embossing roll 7 is longer than the original printed image length of the printed image of the print film 1.

As can be seen from FIG. 5, the stretchable three-layer or three-ply laminate 3 consists of the PVC backing 2 which comprises a glass fiber mat layer 15 as one ply or one layer which has a layer thickness of more than 2400 μm, the PVC print film 1 laminated onto it and has a layer thickness of more than 70 μm, and the clear film 12 applied onto it which has a layer thickness of approximately 500 μm.

The apparatus 11, by way of which the in-register embossing of the laminate 3 is carried out, comprises the above-described elements and, moreover, necessary, known measuring means which are necessary along the production line of the embossed laminate 3 from the feed of the clear film 12 and the print film 1 as far as the discharge of the embossed laminate 3 after running through the embossing station 6, in order to detect and to control positions and speeds of the different material webs, such as the laminate 3, and the speeds of the different drive rolls or drive apparatuses, in order that the necessary control and regulation for setting the desired in-register embossing of the laminate 3 associated with two-stage longitudinal stretching (as described above) of the laminate 3 can be carried out in a customary way. Said measuring means also comprise markings which are present on the laminate 3 or the print film 1, and detection means therefore, and also measuring means for detecting the position and speed of the embossing roll 7. Furthermore, there are also means in the case of the system or apparatus 11, by way of which means the intended plastic longitudinal stretching of the film 1 and/or the elastic longitudinal stretching of the laminate 3 can be brought about. An object of said means is the fixed points 0-3, the respective spacing of which from one another can be, for example, of variable configuration, or at which a high tension (product web tension) can be introduced into the film 1 or the laminate 3 by way of an increase in the rotational speed of a roll. Said longitudinal stretching means are also assigned corresponding measuring devices or measuring means and corresponding control and/or regulating devices.

The invention claimed is:

1. A method for the continuous in-register embossing of a stretchable film provided with a repeating printed image or a laminate formed by way of the stretchable film, wherein the method comprises:
   feeding the stretchable film or the laminate into an embossing station comprising a rotating embossing roll and an associated rotating counter-roll, wherein the rotating embossing roll has an embossed image, wherein a printed image length ($L+\Delta L$) of the stretchable film or the laminate is stretched longitudinally before the embossing contact with the embossing roll to a length greater than or smaller than or equal to the embossed image length ($P_L$) or the circumference of the embossing roll;
   maintaining a register by way of a relative speed ($V_{V4-V3}$) between a circumferential speed ($V_4$) of the embossing roll and the web speed ($V_3$) of the stretchable film or the laminate in the embossing station, wherein the relative speed compensates for a length difference between the longitudinally stretched printed image ($L+\Delta L$) and the embossed image of the embossing roll;
   moving the stretchable film or the laminate between the counter-roll and the embossing roll at a constant web speed ($V_3$) during the in-register embossing; and
   maintaining a constant web tension of the stretchable film or laminate between a first fixed point and a third fixed point; wherein the first fixed point is configured upstream of the embossing station in the running direction of the stretchable film or laminate and holds the film or the stretchable laminate in a supporting manner; and wherein the third fixed point is arranged downstream of the embossing station.

2. The method as claimed in claim 1, wherein during its passage through the embossing station between the first fixed point and a second fixed point (fixed point 2) configured by and/or on the counter-roll in the embossing station and holds the film or the laminate in a supporting manner, the stretchable film or the laminate is longitudinally stretched ($\Delta L_2$) such that the register length is controlled, and is guided from the first fixed point (fixed point 1) via the second fixed point (fixed point 2) between the counter-roll and the embossing roll through the embossing station, at the web speed ($V_3$) which, although it can be regulated, remains constant or brings about the constant web tension after the desired longitudinal stretching ($L+\Delta L_1+\Delta L_2$) is set, to the third fixed point (fixed point 3) which holds the film or the laminate in a supporting manner, the printed image length of the film or laminate being longitudinally stretched between the first fixed point (fixed point 1) and the second fixed point (fixed point 2) to a length ($L+\Delta L_1+\Delta L_2$) greater than or greater than or equal to or smaller than or smaller than or equal to the embossed image length ($P_L$) or the circumference of the embossing roll, and the maintenance of register of the embossing being achieved by way of a circumferential speed ($V_4$) of the embossing roll and the relative speed ($V_{V4-V3}$) determined as a result between the circumferential speed ($V_4$) of the embossing roll and the web speed ($V_3$), which circumferential speed ($V_4$) compensates in a correcting manner for a length difference or the possibly existing length difference between the longitudinally stretched printed image of the film or laminate and the embossed image of the embossing roll.

3. The method as claimed in claim 1, wherein in the case of a length difference between the longitudinally stretched printed image of the film or laminate and the embossed image of the embossing roll, which length difference exists at a second fixed point, or in the region of a second fixed point, the maintenance of register of the embossing is achieved by way of a setting and/or adjustment of the circumferential speed ($V_4$) of the embossing roll and the relative speed ($V_{V4-V3}$) determined as a result between the circumferential speed ($V_4$) of the embossing roll and the web speed ($V_3$) of the film or laminate, which setting and/or adjustment compensates in a correcting manner for the respectively existing length difference between the longitudinally stretched printed image and the embossed image of the embossing roll.

4. The method as claimed in claim 1, wherein the circumferential speed ($V_3$) of the counter-roll is kept constant.

5. The method as claimed in claim 1, wherein in the case of a length difference between the longitudinally stretched printed image of the film or laminate and the embossed image of the embossing roll, which length difference exists at a second fixed point, or in the region of a second fixed point, the maintenance of register of the embossing is achieved by way of a combination of a circumferential speed change both of the circumferential speed ($V_3$) of the counter-roll and of the circumferential speed ($V_4$) of the embossing roll with setting of the desired compensating relative speed between the circumferential speed ($V_4$) of the embossing roll and the web speed ($V_3$) of the film or laminate, which combination compensates in a correcting manner for the respectively existing length difference between the longitudinally stretched printed image of the film or laminate and the embossed image of the embossing roll.

6. The method as claimed in claim 1, wherein in the case of a length difference between the longitudinally stretched printed image of the film or laminate and the embossed image of the embossing roll, which length difference exists at a second fixed point, or in the region of a second fixed point, the maintenance of register of the embossing is achieved by way of a setting and/or adjustment of the circumferential speed ($V_4$) of the embossing roll and the relative speed determined as a result between the circumferential speed ($V_4$) of the embossing roll and the web speed ($V_3$) of the film or laminate, which setting and/or adjustment compensates in a correcting manner for the respectively existing length difference between the longitudinally stretched printed image of the film or laminate and the embossed image of the embossing roll, a ratio of the circumferential speed ($V_4$) of the embossing roll to the circumferential speed ($V_3$) of the counter-roll being set, which ratio is equal to the ratio of the embossed image length of the embossing roll to the length of the longitudinally stretched printed image of the film or the laminate at said second fixed point or in the region of said second fixed point.

7. The method as claimed in claim 1, wherein the printed image of the film or the laminate is longitudinally stretched to a dimensional deviation of the longitudinally stretched printed image from the embossed image length of the embossing roll of up to 50 mm, greater than or lesser than the embossed image length of the embossing roll between a first fixed point, and a second fixed point.

8. The method as claimed in claim 1, wherein the printed image of the film or the laminate is longitudinally stretched to a dimensional deviation of the longitudinally stretched printed image from the embossed image length of the embossing roll of 0.1-20%, greater than or smaller than the embossed image length of the embossing roll between a first fixed point, and a second fixed point.

9. The method as claimed in claim 1, wherein the film or the laminate is heated between a first fixed point, and a second fixed point, to a temperature which makes a plastic deformation of the film or the laminate possible.

10. The method as claimed in claim 1, wherein the film or the laminate is longitudinally stretched plastically and/or elastically between a first fixed point, and a second fixed point.

11. The method as claimed in claim 1, wherein the film or the laminate is longitudinally stretched to a constant printed image length between a first fixed point, and a second fixed point.

12. The method as claimed in claim 1, wherein the film or the laminate is longitudinally stretched between a first fixed point, and a second fixed point to a longitudinally stretched printed image length which differs from the embossed image length or the circumference of the embossing roll.

13. The method as claimed in claim 1, further comprising changing the circumferential speed (V4) of the embossing roll to the web speed (V3) of the film or the laminate, wherein the adjusting of the relative speed occurs without a change in the contact pressure between the counter-roll and the embossing roll and without the counter-roll and the embossing roll being thrown or thrown off.

14. The method as claimed in claim 2, wherein a web speed ($V_3$) which corresponds to the circumferential speed ($V_3$) of the counter-roll is set at the first, second and third fixed point (fixed point 1, fixed point 2, fixed point 3), and the embossing roll is set at a greater or smaller circumferential speed ($V_4$) which differs from said circumferential speed ($V_3$), with setting of the relative speed, which compensates in a correcting manner, between the embossing roll circumferential speed ($V_4$) and the web speed ($V_3$).

15. The method as claimed in claim 1, wherein a constant longitudinally stretched printed image length of the printed image of the film or laminate is set between a first fixed point and a second fixed point, and the maintenance of register of the embossing is achieved by way of an adaptation of the embossing length, which embosses in register, of the embossed image of the embossing roll, which adaptation compensates in a correcting manner for a or the respectively existing length difference between the longitudinally stretched printed image of the film or laminate and the embossed image of the embossing roll, by means of variable adaptation of the circumferential speed ($V_4$) of the embossing roll to the set longitudinally stretched printed image length and therefore the relative speed, which compensates in a correcting manner, between the circumferential speed ($V_4$) of the embossing roll and the web speed ($V_3$) of the film or laminate in the embossing station.

16. The method as claimed in claim 15, wherein a constant longitudinally stretched ($L+\Delta L_1+\Delta L_2$) printed image length is set greater than or smaller than the embossed image length ($P_L$).

17. The method as claimed in claim 1, wherein the film is fed to a first fixed point, with a pre-stretch ($L+\Delta L_1$) of the printed image of the film in the longitudinal direction and the printed image length of the film, which pre-stretch is set between said first fixed point and a zeroth fixed point (fixed point 0) positioned upstream of said first fixed point and holds the film in a supporting manner, and said film is laminated onto a carrier which stabilizes the pre-stretched printed image of the film at said first fixed point or in the region of said first fixed point in order to form the laminate.

18. The method as claimed in claim 1, wherein the laminate is formed at a first fixed point, and is longitudinally stretched, as far as a second fixed point to the respectively set or desired printed image length ($L+\Delta L_1+\Delta L_2$) of the film or laminate.

19. A method as claimed in claim 1, for the continuous in-register embossing of a stretchable film which is provided with a repeating printed image or laminate formed by way of the film in an embossing station which comprises a rotating embossing roll which has an embossed image and an associated rotating counter-roll, the printed image length (L+ΔL) of the film or the laminate being longitudinally stretched, before the embossing contact with the embossing roll, to a length greater than or greater than or equal to or smaller than or smaller than or equal to the embossed image length ($P_L$) or the circumference of the embossing roll, and the film and its printed image length being longitudinally stretched (L+ΔL$_1$), between a zeroth fixed point and the first fixed point to a printed image length, the film longitudinally stretched in this way being laminated onto a carrier which stabilizes the longitudinally stretched printed image with the formation of the laminate at the first fixed point or in the region of the first fixed point (fixed point 1), and, between the first fixed point (fixed point 1) and the third fixed point, the printed image length of the laminate obtained in this way and the embossing embossed length of the embossed image of the embossing roll being adapted to one another by way of, correcting longitudinal stretching (ΔL$_2$) of the laminate between the first fixed point (fixed point 1) and a second fixed point, and/or by way of the relative speed ($V_{V4-V3}$), which compensates in a correcting manner, between the circumferential speed (V$_4$) of the embossing roll and the web speed (V$_3$) of the laminate, said correcting length adaptation being >3% of the correction variable (ΔL$_1$) of the printed image length (L+ΔL$_1$) set between the zeroth fixed point (fixed point 0) and the first fixed point (fixed point 1).

20. The method as claimed in claim 1, wherein the printed image of the film or laminate is longitudinally stretched as far as a second fixed point, to a constant printed image length (L+ΔL$_1$+ΔL$_2$) smaller than or greater than the embossed image length ($P_L$) of the embossing roll, and in that the embossing embossed length of the embossing roll is adapted to the longitudinally stretched (L+ΔL$_1$+ΔL$_2$) printed image length of the film or laminate by means of a circumferential speed (V$_4$) of the embossing roll which generates the relative speed ($V_{V4-V3}$), which compensates in a correcting manner and is adapted to the longitudinally stretched (L+ΔL$_1$+ΔL$_2$) printed image length, of the embossing roll to the web speed (V$_3$) of the film or laminate, the ratio of the circumferential speed (V$_4$) of the embossing roll to the circumferential speed (V$_3$) of the counter-roll being set to be constantly equal to the ratio of the embossed image length ($P_L$) on the embossing roll to the longitudinally stretched (L+ΔL$_1$+ΔL$_2$) printed image length of the film or laminate at the second fixed point or in the region of the second fixed point.

21. The method of claim 1, wherein the circumferential speed of the embossing roll is greater than the circumferential speed of the counter-roll, and wherein the circumferential speed of the embossing roll is greater than the web speed of the stretchable film or laminate when the printed image length to be embossed is smaller than the embossed image length.

* * * * *